United States Patent
Wang et al.

[11] Patent Number: 5,900,474
[45] Date of Patent: May 4, 1999

[54] CATALYST COMPOSITION FOR PRODUCTION OF POLYBUTYLENE TEREPHTHALATE VIA DIRECT ESTERIFICATION PROCESS

[75] Inventors: Chun-Shan Wang; Ching-Shian Lin, both of Tai-Nan, Taiwan

[73] Assignee: National Science Council of Republic of China, Taipei, Taiwan

[21] Appl. No.: 08/914,805

[22] Filed: Aug. 20, 1997

[51] Int. Cl.$^6$ .................................................. C08G 64/00
[52] U.S. Cl. .................................................. 528/272
[58] Field of Search .................................................. 528/309

[56] References Cited

U.S. PATENT DOCUMENTS 4,107,149  8/1978  Bier et al. .................................................. 528/309
4,136,089  1/1979  Bier et al. .................................................. 528/309

*Primary Examiner*—Terressa Mosley
*Attorney, Agent, or Firm*—Bacon & Thomas, PLLC

[57] ABSTRACT

The invention relates to a process of producing polybutylene terephthalate by direct esterification and then melt polycondensation, characterized in that a specific catalyst composition is used, said catalyst composition comprising an organotitanium compound as primary catalyst in an amount of 0.01 to 1.0% by weight of terephthalic acid; and an alkaline metal salt of borate, pyroborate or metaborate as secondary catalyst in an amount of 0.001 to 1.0% by weight of terephthalic acid. By using said catalyt composition, amount of THF by-product generated can be reduced more than 30%, and the reaction rate of esterification can be increased over 20%.
(FIG. 2)

12 Claims, 2 Drawing Sheets

5,900,474

CATALYST COMPOSITION FOR PRODUCTION OF POLYBUTYLENE TEREPHTHALATE VIA DIRECT ESTERIFICATION PROCESS

BACKGROUND OF THE INVENTION

1. Field of Invention

The invention relates to a method for producing polybutylene terephthlate (PBT) by direct esterification and a catalyst composition therefor, and in particular, to a method comprising esterifying terephthalic acid with 1,4-butane diol followed by polycondensation in the presence of organic titanium compounds as primary catalysts and alkaline metal borates as secondary catalysts to produce PBT.

2. Description of the Prior Art

There are numerous literature references and patents relating to synthesis of polybutylene terephthlate (PBT). Although most of these comprise transesterification processes of dimethyl terephthalate(DMT), but a process of direct esterification of terephthlic acid (TPA) had been developed in 1949 as described in U.S. Pat No. 3,936,421. Since 1970, DMT processes have been commercialized sequentially by Celanese, US and the like, however, since TPA process has an advantage over DMT process in the sense of cost, a trend for synthesis of PBT by changing from DMT process into TPA process became apparent. Since the 1970's, the patent literature reported about producing PBT by TPA processes were mostly focused on the studies of selection of catalysts, composition, feed ratio, reaction mechanism and kinetics.

Synthesis of PBT by TPA process has a most difficult technical bottleneck at cyclisation of butane diol (BDO) into tetrahydrofuran (THF) under acid catalysation, such that, if BDO loss is higher than 0.2 mole per mole of TPA, i.e., at a mole ratio of BDO/TPA of 1.7, the loss of BDO is higher than 11%, then TPA process will be no longer more economical than DMT process, that is why most patents relate to the lowering of THF by product formation.

Generation of THF by cyclisation of BDO is predominantly subjected to acid catalysation. Although the solubility of TPA in BDO is low, however, because of strong acidity of TPA, there is sufficient quantity of acid generated acid to catalyze dehydration of BDO, as described in two routes of mechanism shown in FIG. 1. In the presence of acid (H+), BDO will form a carbonium-ion intermediate with excess electron pair of oxygen atom and then form THF via route 1 or 2 shown in FIG. 1.

As shown in FIG. 1, route 1 is a mechanism of SN1 type, comprising dehydration and then cyclisation to form a cyclic intermediate, and finally, deprotonation into formation of THF, wherein the rate is determined on the bonding rate in the cyclisation of $C_1$ and $C_4$ in the primary carbonium-ion, which is a first order reaction. While route 2 is a $SN_2$ type mechanism, wherein $OH_2$ at position $C_1$ is a leaving group, whereas OH at $C_4$ position is an entering group, and the reaction rate is determined on the rate of leaving of OH2 group as well as entering of H to form cydic product which is a second order reaction.

FIG. 2 is a schematic flowsheet of PBT polymerization, wherein those referred by numerals are activation energies of various reaction. In their study on direct esterification of PBT by utilizing model molecule, Pilati et al. (Polymer 17, 799 and 22, 1566) found that the activation energy for formation of THF from BDO is 30.9 kcal/mole, which is higher than that of step 1 of 22.9, but lower than those of step 3 (33.7) and step 5 (33.7), so that reaction at elevated temperature although increases the rate of efficiency of esterification but it also promotes the cyclisation of BOD, while reaction at low temperature may reduce the cyclisation of BOD, but it also reduces the rate of esterification.

Patents relate to the synthesis of PBT via direct esterification process are as follow:

U.S. Pat. No. 3,936,421: uses organic titanium and tin compounds as catalysts, loss of BOD can be reduced, and it also reports that addition of 2–8% of water can increase mixing and dispersing of terephthalic acid and butane diol which results into increasing of initial esterification rate.

U.S. Pat. No. 4,014,858: uses also a combination of titanium and tin type catalysts in order to obtain a minimum esterification time and hence to generate less amount of THF.

U.S. Pat. No. 4,329,444: uses titanium-based catalyst and preheats butane diol to reaction temperature, whereupon terephthalic acid is added slowly so as to decrease the generation of THF.

U.S. Pat. No. 5,015,759: uses also titanium-based catalyst, mole ratio of BDO:TPA is 5:1, and completes esterification at 225 C. in order to reduce generation of THF.

U.S. Pat. Nos. 4,364,213 and 4,439,597: before terephthalic acid is exhausted or 20–30% thereof left unconverted yet, begins to evacuate and carry out polycondensation reaction. When the input mole ratio of BDO/TPA is low then the esterification rate will be slow, on the other hand, if the mole ratio of BDO/TPA is high, the loss of butane diol will be great, hence the optimum mole ratio is in the range of 1.5–1.8. The temperature of esterification is in the range of 208 C. to 212 C.

U.S. Pat. No. 4,565,241: mole ratio of BDO/TPA at initial reaction stage is 0.6–1.0, addition of BDO takes place at latter stage of reaction.

SUMMARY OF THE INVENTION

In view of the above-described advantages of the prior art, the object of the invention is to provide a process for producing polybutylene terephthalate by direct esterification in the presence of a primary titanium-based catalyst in combination with suitable secondary catalyst. Such process can reduce the generation of THF as byproduct and promote the rate of esterification and exhibits the economical advantage of the direct esterification process.

Another object of the invention is to provide a catalyst composition for using in the production of polybutylene terephthalate by direct esterification, which comprising an organotitanium-based catalyst as a primary catalyst and an alkaline metal borate-based catalyst as secondary catalyst, and through using said catalyst composition, the amount of tetrahydrofuran generated can be reduced by more than 30% and the esterification rate can be increased more than 20%.

DETAILED DESCRIPTION OF THE PREFERRED EMBODIMENT

Figure 1:
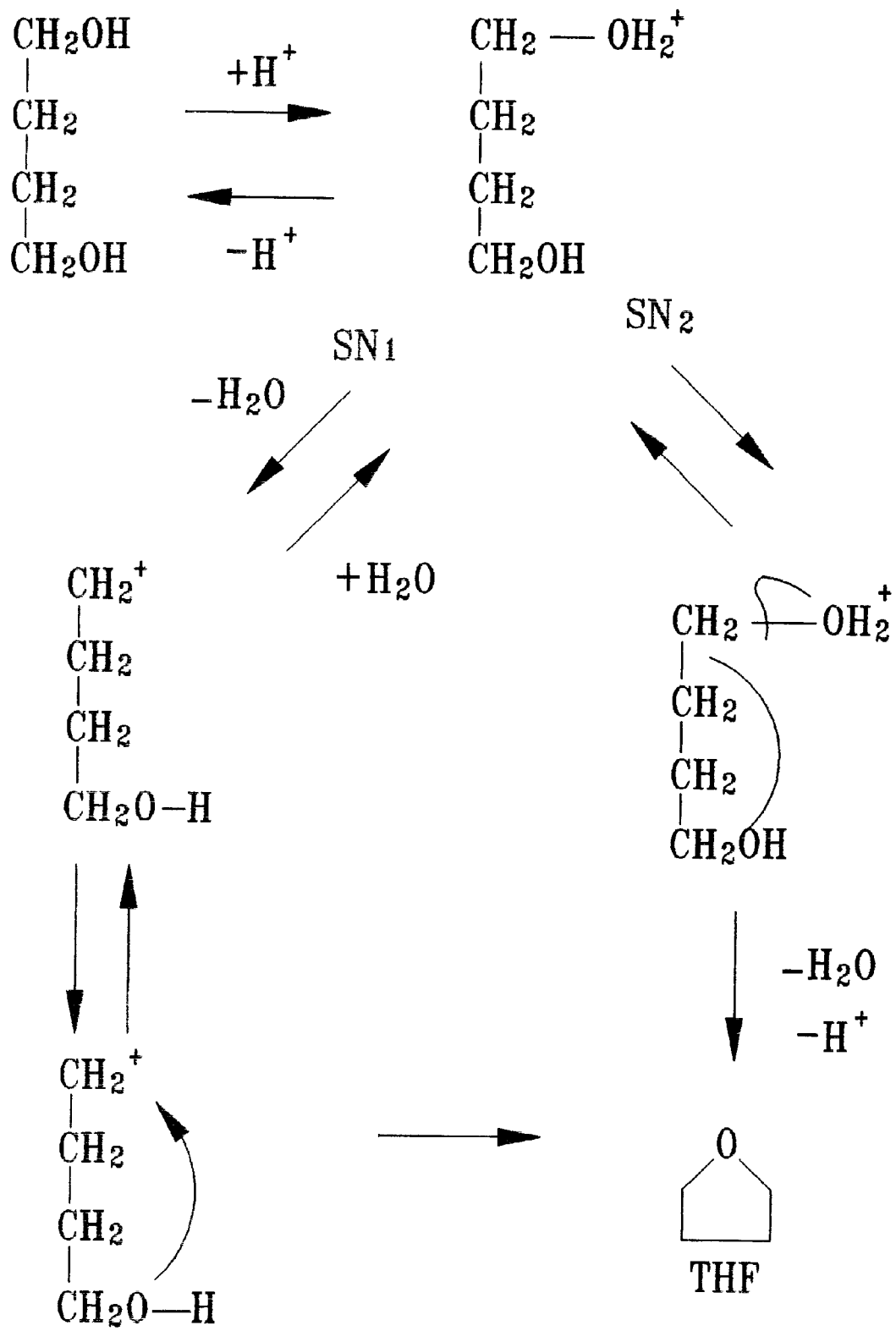
FIG. 1 shows the reaction mechanism of formation of THF from BDO.
Figure 2:
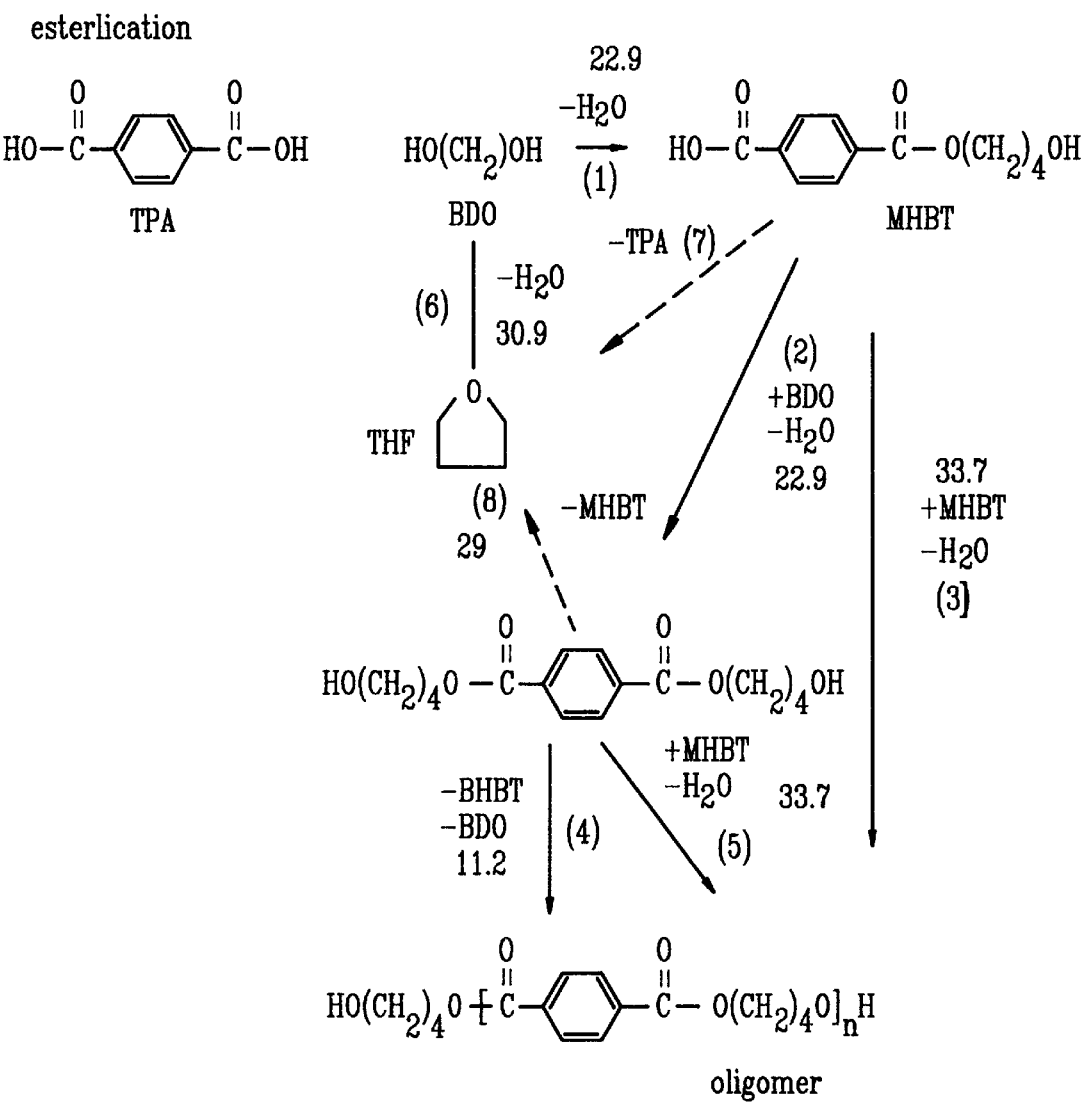
FIG. 2 shows reaction routes for PBT polymerization.
Figure 2:
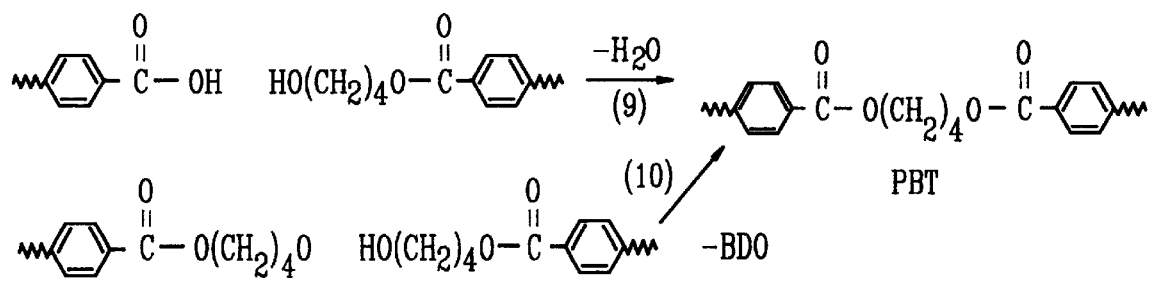

The invention relates to an improved process for producing polybutylene terephthalate by direct esterification, characterized in that a specific catalyst composition is used in the reaction of terephthalic acid and 1,4-butane diol, and such catalyst composition comprises: (1) an organotitanium compound as primary catalyst in an amount of 0.01–1.0% by weight of terephthalic acid; and (2) an alkaline metal salts of borate, pyroborate or metaborate as secondary catalyst in an amount of 0.001–1.0% by weight of terephthalic acid. Suitable organotitanium compounds useful as primary catalyst in the invention include tetrabutyl titanate, tetra (isopropyl) titanate, tetrapropyl titanate, tetraphenyl titanate, and the like, where tetrabutyl titanate and tetra(isopropyl) titanate are the preferred ones. Suitable alkaline metal salts of borate, pyroborate and metaborate useful as secondary catalyst in the invention include salts of lithium, sodium, potassium and the like, such as, sodium tetraborate (commonly known as borax), sodium pyroborate and sodium metaborate, where sodium tetraborate and sodium metaborate are the preferred ones.

In the application of such improved catalyst composition, the primary and secondary catalysts can be added simultaneously into the reaction mixture which usually contains excess butane diol with respect to terephthalic acid. Preferably, the mole ratio of BDO/TPA is in the range of 1.5–2.0. Alternatively, the organotitanium-based primary catalyst can be mixed with terephthalic acid while the borates mixed with butane diol, and both mixtures can be mixed into a reaction mixture.

As described above, the reaction mechanism include two stages, namely, esterification stage and polycondensation stage, wherein the polycondensation stage is carried out at a temperature generally higher than that at esterification stage and also at a higher vacuum. In general, esterification reaction takes place at a temperature of 210–230 C. and under atmospheric pressure, while water and THF generated during the reaction are taken off by nitrogen; the polycondensation reaction takes place at a temperature of 260–280 C. and under a pressure of 0.1–3 mmHg, and excess butane diol is distilled off.

The inventive catalyst composition comprising a titanium-based compounds as primary catalyst in combination with a borate as secondary catalyst not only can reduce the amount of THF generated as a by-product to more than 30%, but also can promote reaction rate of esterification more than 20%.

EXAMPLES

Example 1

A mixture of TPA (0.5 mole), BDO (0.85 mole) (BDO/TPA=1.7), tetrabutyl titanate as primary catalyst (0.068 g, 0.04% by weight of TPA) and $Na_4B_4O_7$ as secondary catalyst (0.017 g, 0.01% by weight of TPA) were charged into a reactor equipped with a distillation column (circulated with an oil of 120 C so as not to condense water and THF generated during the reaction and returning to the reactor), a stirrer, a nitrogen inlet, and a temperature controlling means. Heat to about 215 C. and increase the temperature gradually to 225 C. as reaction proceeds, and then, maintain at 228 C. till reaction becomes clear and water and THF cease to distill off, thus, complete the esterification reaction as the first stage. Since the temperature reaches 215 C., samples are taken sequentially at an interval of 20 minutes for analyzing the conversion rate of TPA and the amount of THF in the distillate collected. Results obtained are set forth in Table 1 and 2. After the esterification reaction is completed, increase the temperature of the reaction mixture to 260 C., stop nitrogen inlet and begin to evacuate slowly to reach and maintain at a vacuum of about 1.0 mmHg. The polycondensation reaction time is 90 minutes. The intrinsic viscosity (IV) of the product thus obtained is also set forth in Table 1.

Example 2

The secondary catalyst used in Example 1 is changed into NaBO2 and its amount is 0.04% by weight of TPA. The remainder reaction conditions are same as in Example 1. Results obtained are also set forth in Table 1 and 2.

Comparative Example 1

Reaction conditions are same as in Example 1 except that no secondary catalyst is added. Results obtained are set forth in Table 1 and 2.

It can be seen apparently that the combination of tetrabutyl titanate as primary catalyst with Na4 B4 O7 and NaBO2 as secondary catalyst not only can reduce the amount of THF generated as a by-product by more than 40%, but also can promote the reaction rate by more than 20%.

While objects, feature and effects of the invention have been described with preferred embodiments thereof, however, it will be appreciated that partial changes and modifications thereto can be made by those skilled in the art based on the above description without departing to the spirit and scope of the invention.

TABLE 1

| | Conversion rate with time | | | | | | | | |
|---|---|---|---|---|---|---|---|---|---|
| | TPA conversion rate at indicated Esterification time (min) | | | | | | | poly-condensation | |
| sec. catalyst/time | 20 min | 40 min | 60 min | 80 min | 90 min | 100 min | 130 min | time (min) | IV |
| $Na_4B_4O_7$ | 22 | 43 | 70 | 90 | clear | | | 90 | 0.77 |
| $NaBO_2$ | 20 | 35 | 60 | 80 | 90 | clear | | 90 | 0.75 |
| None | 16 | 30 | 58 | 70 | 76 | 82 | clear | 90 | 0.72 |

Clear point is an indicator for determining the completion of esterification. At the time that the esterification reaction mixture turns from turbid into clear, it is indicated that reaction of TPA is complete and polycondensation can be started.

TABLE 2

Yield of THF

| sec. catalyst/time | 20 min | 40 min | 60 min | 80 min | 90 min | 100 min | 130 min |
|---|---|---|---|---|---|---|---|
| Na$_4$B$_4$O$_7$ | 0.3 g (0.49) | 1.1 g (1.8) | 1.5 g (2.5) | 1.8 g (2.9) | 2.0 g (3.3) (completely esterified) | | |
| NaBO$_2$ | 0.5 g (0.82) | 1.3 g (2.1) | 2.0 g (3.3) | 2.5 g (4.1) | 2.7 g (4.4) | 3.0 g (4.9) (completely esterified) | |
| None | 1.4 g (2.3) | 2.5 g (4.1) | 3.6 g (5.9) | 4.2 g (6.9) | 4.4 g (7.2) | 4.7 g (7.7) | 5.0 g (8.2) (completely esterified) |

Accumulated THF yield (mol %)

What is claimed is:

1. A catalyst composition for producing polybutylene terephthalate by direct esterification, said catalyst composition comprising:
   an organotitanium compound as primary catalyst, in an amount of 0.01–1.0% by weight of terephthalic acid; and
   an alkaline metal of borate, pyroborate or metaborate as secondary catalyst, in an amount of 0.01–1.0% by weight of terephthalic acid.

2. A catalyst composition as in claim 1, wherein said organotitanium compound is tetrabutyl titanate or tetra (isopropyl) titanate.

3. A catalyst composition as in claim 1, characterized in that it is used in a direct esterification process which comprises esterifying terephthalic acid with butane diol, and then polycondensing reaction to produce polybutylene terephthalate.

4. A catalyst composition as in claim 1, wherein said organotitanium compound used as primary catalyst is used in an amount of 0.01–0.5% by weight of terephthalic acid.

5. A catalyst composition as in claim 1, wherein said secondary catalyst is alkaline salt of borate, pyroborate metaborate, and said alkaline metal is lithium, sodium or potassium.

6. A catalyst composition as in claim 1, wherein said secondary catalyst is an alkaline metal salt of borate, pyroborate or metaborate, and its amount is 0.01–0.5% by weight of terephthalic acid.

7. A process for producing polybutylene terephthalate by direct esterification, comprising:
   (A) preparing a catalyst composition comprising an organotitanium compound as primary catalyst in an amount of 0.01–1.0% by weight of terephthalic acid, and an alkaline metal salt of borate, pyroborate or metaborate as secondary catalyst in an amount of 0.001–1.0% by weight of terephthalic acid;
   (B) mixing said catalyst composition with terephthalic acid and butane diol in a reactor, wherein butane diol is in excess with repect to terephthalic acid (mole ratio= 1.7~2.0),
   (C) heating to a temperature of 200~400° C. and carrying out esterification reaction, while THF by-product is continously distilled off; and
   (D) heating further to a temperature of 240~300° C. and accomplishing polycondensation reation under high vacuum, while removing excess butane diol and thus obtaining polybutylene terephthalate.

8. A process of producing polybutylene terephthalate as in claim 7, wherein said organotitanium compound as primary catalyst is used in an amount of 0.01~0.5% by weight of terephthalic acid.

9. A process of producing polybutylene terephthalate as in claim 7, wherein said alkaline salt of borate, pyroborate or metaborate as secondary catalyst is used in an amount of 0.001~0.5% by weight of terephthalic acid.

10. In a process for producing polybutylene terephthalate from terephthalic acid and butane diol in two stages comprising esterification and polycondensation, wherein the improvement comprises using a catalyst composition comprising an organotitanium compound as primary catalyst and an alkaline metal salt of borate, pyroborate or metaborate as a secondary catalyst, said catalyst being present in an amount sufficient to reduce the amount of tetrahydrofuran generated as by-product and promote the reaction rate of esterification.

11. A process as claimed in claim 10 wherein said organotitanium compound is used in an amount of 0.05 to about 0.5% by weight of the terephthalic acid and the alkaline borate, pyroborate or metaborate is used in an amount of 0.001 to about 0.5% by weight of the terephthalic acid.

12. The process according to claim 11 wherein the organotitanium compound is tetrabutyl titanate or tetra (isopropyl) titanate and the alkaline salt is a lithium, sodium or potassium salt.

* * * * *